United States Patent [19]

Willis

[11] 4,285,493
[45] Aug. 25, 1981

[54] VALVE OPERATOR
[75] Inventor: Gordon A. Willis, Canoga Park, Calif.
[73] Assignee: Borg-Warner Corporation, Chicago, Ill.
[21] Appl. No.: 16,654
[22] Filed: Mar. 1, 1979
[51] Int. Cl.³ .................... F16K 31/143; F16K 31/50
[52] U.S. Cl. .......................................... 251/14; 92/75; 92/76; 251/31; 251/58; 251/229; 251/280
[58] Field of Search ................ 74/424.8 B, 425.8 VA; 92/50, 69, 75, 76; 251/14, 31, 229, 280, 58

[56] References Cited
U.S. PATENT DOCUMENTS

| | | | |
|---|---|---|---|
| 1,532,029 | 3/1925 | Bobbitt | 92/75 |
| 1,627,658 | 5/1927 | Mauss | 92/75 |
| 2,042,906 | 6/1936 | McElwaine | 92/76 |
| 4,029,289 | 6/1977 | Miffre | 251/58 |
| 4,050,670 | 9/1977 | Borg et al. | 251/229 |

FOREIGN PATENT DOCUMENTS 1285515  8/1972  United Kingdom .
1373070  11/1974  United Kingdom .
1476069  6/1977  United Kingdom .................... 251/14

Primary Examiner—Martin P. Schwadron
Assistant Examiner—G. L. Walton
Attorney, Agent, or Firm—Aubrey L. Burgess

[57] ABSTRACT

A fail-safe-open actuator for actuating valves and the like which comprises a pair of opposed cylinders joined to define piston chambers, the axes of which are generally perpendicular to a valve stem. Pistons in the cylinders are connected to the valve stem by toggle links, the pistons being resiliently urged toward the ends of the assembly which corresponds to an open-valve position. To close the valve, a pressurized fluid, such as air, is introduced into the piston chambers and to the pistons at sufficient pressure to counter the resilient means so as to move the pistons away from their rest, valve-open positions, and thus move the valve stem perpendicularly to the axis of the piston chamber. A handwheel is provided to manually close the valve by moving the pistons from their rest positions.

A solenoid controlled pneumatic valve may be used to control the supply of pressurized fluid, such as air, to the actuator. Either a failure in fluid pressure or an electrical failure will result in the pistons being urged to the rest positions and also result in opening the connected valve, i.e., the failure mode.

2 Claims, 3 Drawing Figures

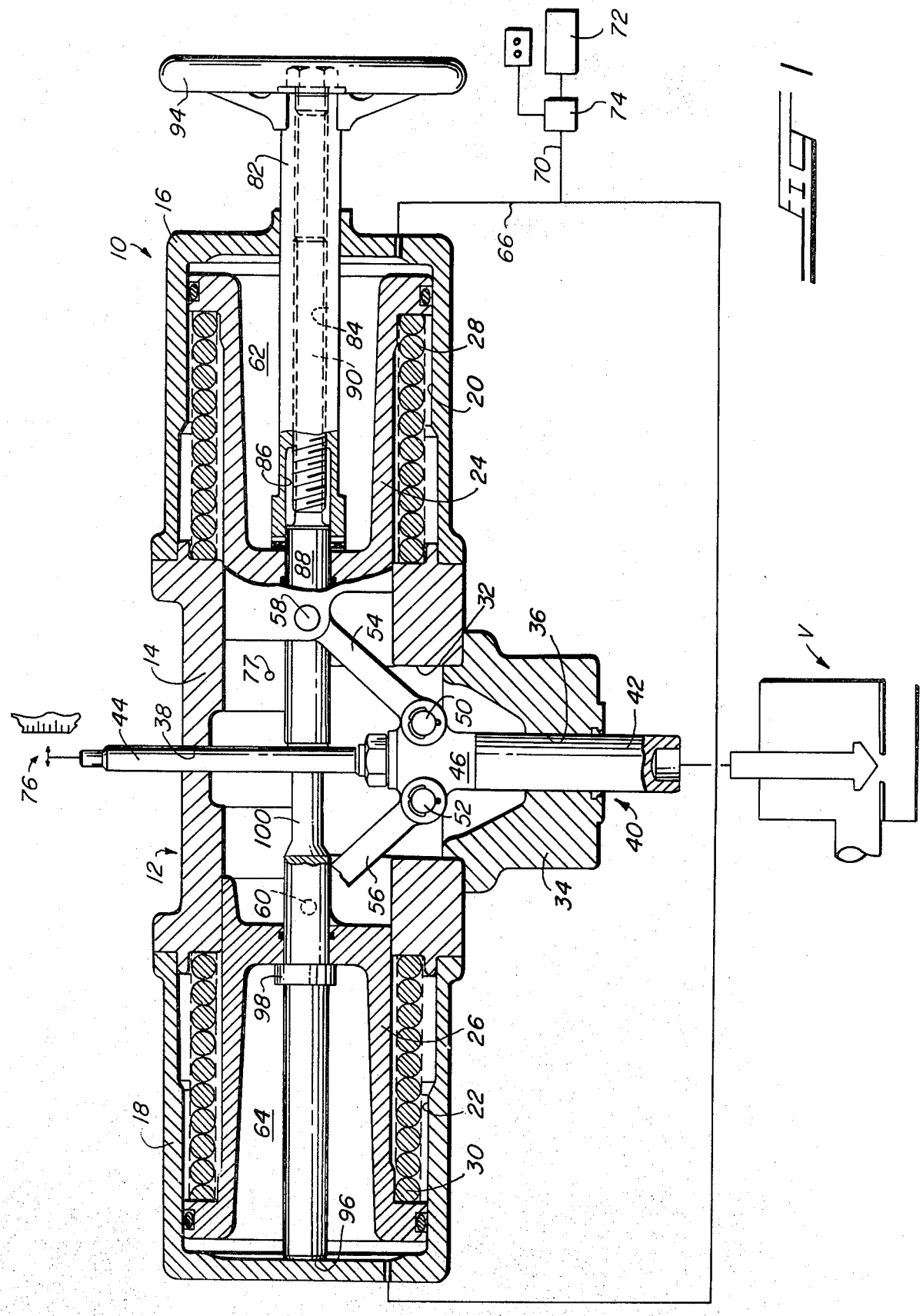

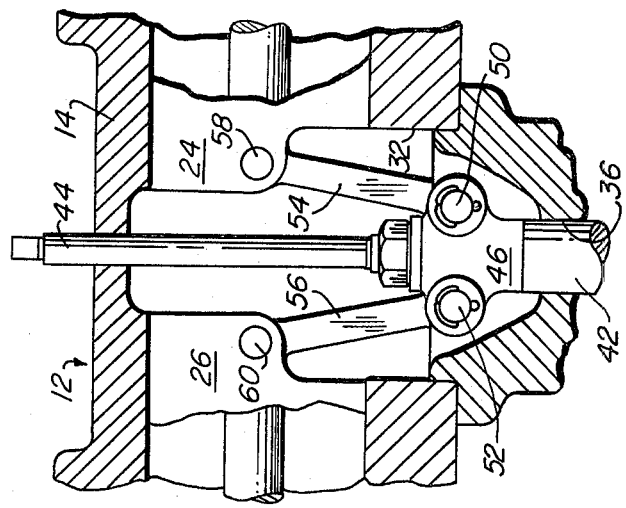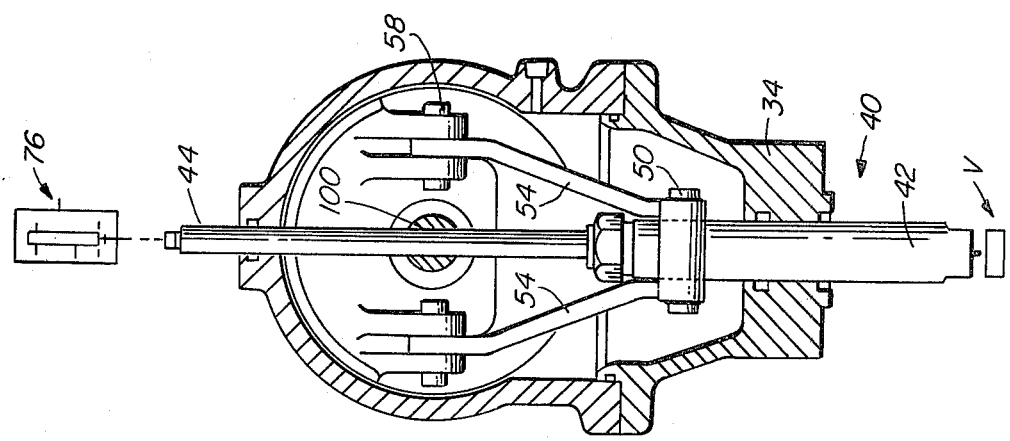

VALVE OPERATOR

BACKGROUND OF THE INVENTION

Fluid actuated operators associated with valves are known in the art. At least some of the prior art actuators use springs and pistons where the maximum spring load occurred when the valve is in its closed position. Other prior art teachings for valve actuators use pistons, but omit spring means urging the pistons in a given direction.

Still other valve operating mechanisms use toggle links to increase output force as compared to input force. Examples of these are described in U.S. Pat. Nos. 1,007,275; 1,603,005; 2,354,987 and 2,370,604.

Another device incorporates a toggle link associated with a pneumatic type diaphragm to actuate valves; this also incorporates a manual override and is described in Bulletin No. 377E (copyrighted 1976) and entitled "The EF System of Control Valves" of Masoneilan International, Inc., Norwood, Mass. 02062.

THE INVENTION

In the valve actuators according to this invention, a pair of opposed pistons are urged away from each other by coil springs and the motion is translated by toggle links to a valve stem or operator arranged to move perpendicularly to the axis of the pistons. To close the valve, a pressurized fluid, such as air, is introduced into zones behind the pistons, moving the pistons toward each other against the spring forces and translating the motion to the valve stem or operator rod by the toggle links.

A solenoid operated valve is ideal to control the supply of the air to the operators. Failure of the air supply or electrical failure will result in the springs urging the pistons away from the center and the opening of the connected valve.

Manual operation and override can also be accomplished by using a screw connected to the pistons and operating the screw by a handwheel.

The operating rod can be connected to a visual indicator or a position switch to indicate the open or closed positions of the valve.

THE DRAWINGS

FIG. 1 is a partial sectional elevational view of the apparatus of this invention;

FIG. 2 is a sectional view taken on line 2—2 of FIG. 1; and

FIG. 3 is an enlarged view of a portion of the apparatus of FIGS. 1 and 2 showing the toggle links in a different position.

DETAILED DESCRIPTION

Attention is invited to the drawings and especially FIGS. 1 and 2 wherein a fluid or pneumatic valve operator 10, built according to this invention, is illustrated. The operator 10 comprises a generally cylindrical body 12 having a center section 14 with cup-like end caps 16, 18 at the ends, there thus being formed a pair of opposed cylinders 20 and 22. Pistons 24 and 26 are received in the respective cylinders 20 and 22 and each is urged away from the other by coil springs 28 and 30, respectively.

Centrally of the body 12 is an opening 32 to which a depending adaptor 34 is connected. The adaptor 34 can be bolted or otherwise connected to center section 14 of the body 12 and is provided with a central opening 36 which acts as a bearing to stabilize the system. The opposed portion of the center section 14 of the body 12 is provided with a central opening 38.

A valve operating rod or shaft generally identified as 40 passes through the openings 36, 38. The rod 40 comprises a portion 42 slidable in the opening 36 and another portion 44 slidable in the opening 38. A clevis 46 is retained on the shaft 40 and the shaft 40 is connected to the valve V, as is indicated by broken lines in the drawing. The clevis 46 is retained on the shaft 40 by a nut 48. The clevis 46 is provided with trunnions 50, 52 to which are connected toggle links 54, 54, 56, 56. The toggle links 54, 54, 56, 56 are connected at their opposite ends by trunnions 58, 58, 60, 60 on the pistons 24, 26, respectively.

A pressurized fluid, generally air, can be introduced into the chambers 62, 64 formed by the pistons 24, 26 and the end 16, 18, respectively through conduits 66, 68 and 70 from a source indicated at 72. A two-way valve means 74 is in the conduit 70 to control the supply of air to and from the chambers 62, 64. Preferably, this is a solenoid valve which can be operated from a remote location. A visual indicator or a position switch 76 can be connected to the shaft 40 which extends beyond the body 12.

Introduction of air from the source 72 through the valve 74 into the chambers 62, 64 at sufficient pressure acts on the pistons 24, 26 and moves them, against the force of the springs 28, 30, toward the center. A suitable vent opening 77 exhausts air from the zone between the pistons. The shaft 40 is moved downwardly perpendicularly to the axis of the piston chamber because of the toggle links 54, 56, and the valve V is closed. Exhaust of air from the chambers 62, 64 through the valve 74 reverses the action and provides the fail safe mode. In the event of failure of the air source or electric supply, the springs 28, 30 force the pistons 24, 26 away from each other and the valve V is opened.

A manual override for the solenoid operator is also provided. It comprises a hollow shaft 82 which passes through and is sealed with respect to the end cap 16. The shaft 82 is internally threaded as at 84 and has an end cylindrical inner surface 86 into which a shaft 88 is received. The shaft 88 has an extending diameter part 90 which is externally threaded as at 92 to mate with the threads 84. A handwheel 94 is connected to the shaft 82 so that rotation of the handwheel causes rotation of the shaft.

The shaft 88 passes through the end of the piston 24 and is sealed with respect thereto through the piston 26, and its terminal end 96 abuts the end cap 18 when the pistons 24, 26 are in the position illustrated in FIG. 1. An enlarged collar portion 98 abuts the inner end of the piston 26 and the shaft 88 is sealed with respect thereto. The shaft 88 is slotted at 100 to permit movement with respect to the valve operating shaft 40. By turning the handwheel 94, the shaft 88 moves to the right because of the mating of the threads 84 and 92 (as viewed in FIG. 1), and the collar 98 abutting the piston 26 causes movement of the piston 26 to the right, thus causing downward movement of the shaft 40 becuase of the trunnions and links and closing of the valve. Turning the handwheel 94 in the opposite direction will result in a return to the FIG. 1 position.

The sealing of parts referred to its accomplished by O-rings and gaskets which are used wherever necessary.

The structural arrangement just described provides a system which generates the largest forces when the shaft 40 is in the valve-closed position.

I claim:

1. A fail-safe-open valve operator comprising:

a pair of opposed cylinders joined together;

a piston in each cylinder and each defining with its cylinder a piston chamber located at opposed ends of said joined cylinders;

said pistons being movable between a normal position spaced from each other corresponding to a valve-open position and a position closely adjacent to one another corresponding to a valve-closed position;

resilient means in said cylinders and surrounding said pistons urging said pistons to their normal positions spaced from each other;

a valve operating rod movable in directions normal to the pistons and having a valve member adapted to be seated on a valve seat, said rod being movable between said valve-open position in which said valve member is spaced from said valve seat and said valve-closed position in which said valve member is seated on said valve seat;

toggle link means connecting said pistons and said valve operating rod for providing the valve operating rod movement;

means to supply a pressurized fluid to each chamber and to the piston therein to counter said resilient means and to move said pistons and said valve operating rod to their valve-closed position wherein said pistons are closely adjacent one another;

said resilient means moving said pistons and said valve operating rod to their valve-open positions upon failure of said pressurized fluid supply means to supply pressurized fluid to said chambers.

2. A valve operator as recited in claim 1 further comprising means to manually move said pistons and said valve operating rod between their positions.

* * * * *